United States Patent
Grinius et al.

(10) Patent No.: US 11,005,811 B2
(45) Date of Patent: May 11, 2021

(54) COMPUTER SYSTEMS AND METHODS FOR MANAGING IP ADDRESSES

(71) Applicant: Digital Energy Technologies Ltd., St. Albans (GB)

(72) Inventors: Vincentas Grinius, London (GB); Aistis Zenkevicius, Kaunas (LT); Zilvinas Vaickus, Romainiu Kaimele (LT); Linas Zilinskas, Jonuciu II (LT); Edgaras Skorupskas, Kaunas (LT)

(73) Assignee: IPXO LIMITED, St. Albans (GB)

( * ) Notice: Subject to any disclaimer, the term of this patent is extended or adjusted under 35 U.S.C. 154(b) by 0 days.

(21) Appl. No.: 16/593,981

(22) Filed: Oct. 5, 2019

(65) Prior Publication Data

US 2021/0105250 A1    Apr. 8, 2021

(51) Int. Cl.
*H04L 29/12* (2006.01)
*G06Q 30/06* (2012.01)

(52) U.S. Cl.
CPC ..... *H04L 61/6068* (2013.01); *G06Q 30/0613* (2013.01); *H04L 61/2007* (2013.01); *H04L 61/2046* (2013.01); *H04L 61/2061* (2013.01); *H04L 61/2084* (2013.01); *H04L 61/2571* (2013.01)

(58) Field of Classification Search
CPC .............. G06Q 30/06; G06Q 30/0601; G06Q 30/0613; G06Q 30/0645; G06Q 30/08; H04L 61/20; H04L 61/2007; H04L 61/2046; H04L 61/2061; H04L 61/2084; H04L 61/2571; H04L 61/6068
See application file for complete search history.

(56) References Cited

U.S. PATENT DOCUMENTS

| | | | | |
|---|---|---|---|---|
| 9,336,551 | B1 * | 5/2016 | Hegg | H04L 61/2007 |
| 9,479,475 | B1 * | 10/2016 | Mazarick | H04L 61/2007 |
| 10,893,022 | B1 * | 1/2021 | Li | H04L 45/748 |
| 2004/0042596 | A1 * | 3/2004 | Kim | G06Q 10/00 379/112.01 |

(Continued)

FOREIGN PATENT DOCUMENTS

GB    2552849 A    2/2018

OTHER PUBLICATIONS

Mueller, Milton. Scarcity in IP addresses: IPv4 address transfer markets and the regional internet address registries. Internet Governance Project (2008). (Year: 2008).*

(Continued)

*Primary Examiner* — Vivek Srivastava
*Assistant Examiner* — William C McBeth
(74) *Attorney, Agent, or Firm* — Rimon PC; Marc Kaufman

(57) ABSTRACT

A computer architecture for managing Internet Protocol (IP) addresses data. Implementations may: receive, from an IP address management system of an registrant, a request to add an IP resource to the marketplace; query an ROA database to confirm the registrant; conduct an external border gateway protocol query to confirm that the subnet is an available subnet; record the at least one IP address subnet information as a subnet record in a marketplace database along with state metadata indicating that the at least one IP address subnet is in a pending state; create route objects and record the route objects as RADb records.

29 Claims, 4 Drawing Sheets

(56) References Cited

U.S. PATENT DOCUMENTS

| | | | | |
|---|---|---|---|---|
| 2015/0074579 | A1* | 3/2015 | Gladstone | G06Q 30/0277 715/771 |
| 2016/0373405 | A1* | 12/2016 | Miller | H04L 61/2007 |
| 2017/0324738 | A1* | 11/2017 | Hah | H04L 61/2061 |
| 2018/0018723 | A1 | 1/2018 | Nagla et al. | |
| 2020/0021556 | A1* | 1/2020 | Goelitz | H04L 61/2007 |
| 2020/0186458 | A1* | 6/2020 | Farag | H04L 61/2046 |

OTHER PUBLICATIONS

Park, Cheol-Soon, Jae-Cheol Ryou, and Yong-Tae Park. "IPv4 Address Trading Using Resource Certificate." Journal of Information Processing Systems 6.1 (2010): 107-120. (Year: 2010).*

Kuerbis, Brenden, and Milton Mueller. "Negotiating a new governance hierarchy: An analysis of the conflicting incentives to secure internet routing." Communications and Strategies 81 (2011): 125-142. (Year: 2011).*

"Heficed launches disruptive IPv4 address lease and monetization platform—IP address market". ICT Monitor Worldwide (Nov. 30, 2019). (Year: 2019).*

Abdulsalam, Nurudeen K. "Border Gateway Protocol (BGP) Security." (2010). (Year: 2010).*

Richter, Philipp, et al. "A primer on IPv4 scarcity." ACM SIGCOMM Computer Communication Review 45.2 (2015): 21-31. (Year: 2015).*

Laris Benkis: "A practical approach to identify weaknesses and highlight strategies for Practical BGP Security: Architecture, Techniques and Tools", Jan. 1, 2005 (Jan. 1, 2005), XP055757675, Retrieved from the Internet: URL:http://citeseerxist.psu.edu/viewdoc/download?doi=10.1.1.110.1488&rep=repl&type= pdf [retrieved on Dec. 8, 2020] p. 4.

Bush Internet Initiative Japan R: 11 Origin Validation Operation Based on the Resource Public Key Infrastructure (RPKI); rfc7115. txt 11, Internet Engineering Task Force, IETF; Standard, Internet Society (ISOC) 4, Rue Des Falaises CH—1205 Geneva, Switzerland,Jan. 15, 2014 (Jan. 15, 2014), pp. 1-11, XP015096708, [retrieved on Jan. 15, 2014]; paragraph [0001].

Yossi Gi Lad et al: 11 Are We There Yet? on RPKI's Deployment and Security, IACR, International Association for Cryptologic Research, vol. 20161224:222026, Nov. 30, 2016 (Nov. 30, 2016), pp. 1-16, XP061022256, [retrieved on Nov. 30, 2016] paragraphs [0001], [0002].

International Searching Authority, International Search Report and Written Opinion for International Application No. PCT/IB2020/059248 dated Feb. 9, 2021.

* cited by examiner

COMPUTER SYSTEMS AND METHODS FOR MANAGING IP ADDRESSES

FIELD OF THE DISCLOSURE

The present disclosure relates to a computer architecture and computer-implemented method for managing Internet Protocol (IP) addresses.

BACKGROUND

Any request by a user to access the public Internet requires the assignment of a unique public IP address to a client device associated with the user request. Therefore, service providers often have a prescribed set of public IP addresses available to assign to respective subscriber devices. Equipped with a public IP address, a subscriber device may then access the public Internet and thus access services of a service provider.

Typically, Regional Internet Registries (RIRs) allocate blocks of IP address to be managed by Local Internet Registries (LIRs). RIR guidelines permit LIRs to register the IP addresses to ISPs, Enterprises, and other entities that would like to provide the addresses to user client devices or otherwise control the IP addresses. A registrant has broad rights with respect to IP addresses but does not have legal ownership of the IP addresses. Such entities having substantial control over specified IP addresses, and authorized agents thereof, are referred to as "registrants" herein.

As the number of Internet services proliferates and the number of users of these services increases exponentially, public IP addresses are becoming a scarce resource and IP address management is becoming a critical problem. In a typical cloud service provider scenario, inventories of public IP addresses registered to a service provider relatively small. As the subscriber base of service providers increases, many service providers are not able to satisfy the demand for IP addresses out of their existing inventory. There are many IP addresses registered to other parties, such as enterprises. Further, many of these IP addresses are not currently in use by the registrants. However, registrants are reluctant to transfer registration of unused IP addresses to another party, such as an ISP in need of additional addresses because the registrants may need the IP addresses at a later date as internal needs grow. As a result of this situation, there are many service providers desperately in need of temporary use of IP addresses and many other parties (registrants) with currently unused IP addresses. However, there is no pragmatic mechanism for managing the unused IP addresses in a manner that allows temporary use by parties other than the registrants.

SUMMARY

One aspect of the present disclosure relates to a system configured for managing IP addresses. The system may include one or more hardware processors configured by machine-readable instructions. The processor(s) may be configured to receive, from an IP address management system of a registrant, a request to add an IP resource to the system. The request may include IP address subnet information specifying at least one IP address subnet associated with the registrant, and information indicating the identity of the registrant. The processor(s) may be configured to query a route origin authorization database to confirm that the registrant corresponds to an authorized autonomous system (AS) that is authorized to originate the at least one IP address subnet. The processor(s) may be configured to conduct an external border gateway protocol query to confirm that the subnet is an available subnet that is not within use by an entity other than the registrant. The processor(s) may be configured to record, in response to confirmation that the registrant corresponds to an authorized autonomous system and that the subnet is an available subnet, the at least one IP address subnet information as a subnet record in a database along with state metadata indicating that the at least one IP address subnet is in a pending state. The processor(s) may be configured to create at least one route object corresponding to the at least one subnet and recording the route objects as RADb records. The route objects may include a route, an origin, and a description. The processor(s) may be configured to confirm that the information in the route objects has been propagated to transit provider routers. The processor(s) may be configured to, in response to the confirming, change the state metadata to indicate that the at least one IP address subnet is in a valid state that is available for assignment to client devices by parties other than the registrant.

Another aspect of the present disclosure relates to a method for managing IP addresses. The method may include receiving, from an IP address management system of a registrant, a request to add an IP resource to a database. The request may include IP address subnet information specifying at least one IP address subnet associated with the registrant, and information indicating the identity of the registrant. The method may include querying a route origin authorization database to confirm that the registrant corresponds to an authorized autonomous system that is authorized to originate the at least one IP address subnet. The method may include conducting an external border gateway protocol query to confirm that the subnet is an available subnet that is not within use by an entity other than the registrant. The method may include recording, in response to confirmation that the registrant corresponds to an authorized autonomous system and that the subnet is an available subnet, the at least one IP address subnet information as a subnet record in a marketplace database along with state metadata indicating that the at least one IP address subnet is in a pending state. The method may include creating at least one route object corresponding to the at least one subnet and recording the route objects as RADb records. The route objects may include a route, an origin, and a description. The method may include confirming that the information in the route objects has been propagated to transit provider routers. The method may include, in response to the confirming, changing the state metadata to indicate that the at least one IP address subnet is in a valid state that is available for assignment to client devices by parties other than the registrant.

Yet another aspect of the present disclosure relates to a non-transient computer-readable storage medium having instructions embodied thereon, the instructions being executable by one or more processors to perform a method for managing IP addresses. The method may include receiving, from an IP address management system of a registrant, a request to add an IP resource to a database. The request may include IP address subnet information specifying at least one IP address subnet associated with the registrant, and information indicating the identity of the registrant. The method may include querying a route origin authorization database to confirm that the registrant corresponds to an authorized autonomous system that is authorized to originate the at least one IP address subnet. The method may include conducting an external border gateway protocol query to confirm that the subnet is an available subnet that is not within use by an entity other than the registrant. The method may include recording, in response to confirmation that the registrant corresponds to an authorized autonomous system and that the subnet is an available subnet, the at least one IP address subnet information as a subnet record in a marketplace database along with state metadata indicating that the at least one IP address subnet is in a pending state. The method may include creating at least one route object corresponding to the at least one subnet and recording the route objects as RADb records. The route objects may include a route, an origin, and a description. The method may include confirming that the information in the route objects has been propagated to transit provider routers. The method may include, in response to the confirming, changing the state metadata to indicate that the at least one IP address subnet is in a valid state that is available for assignment to client devices by parties other than the registrant.

The implementations described herein can provide the technical basis for a marketplace in which registrants can list unused IP addresses and other parties can purchase use rights in thee IP addresses. For example, an ISP in need of additional IP addresses for client devices of users, can purchase the right to use the IP addresses from an enterprise. The implementations described herein dynamically ensure that the IP addresses are available before allowing further use by others. Further, the implementations track use and ensure that the registrant is compensated appropriately.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
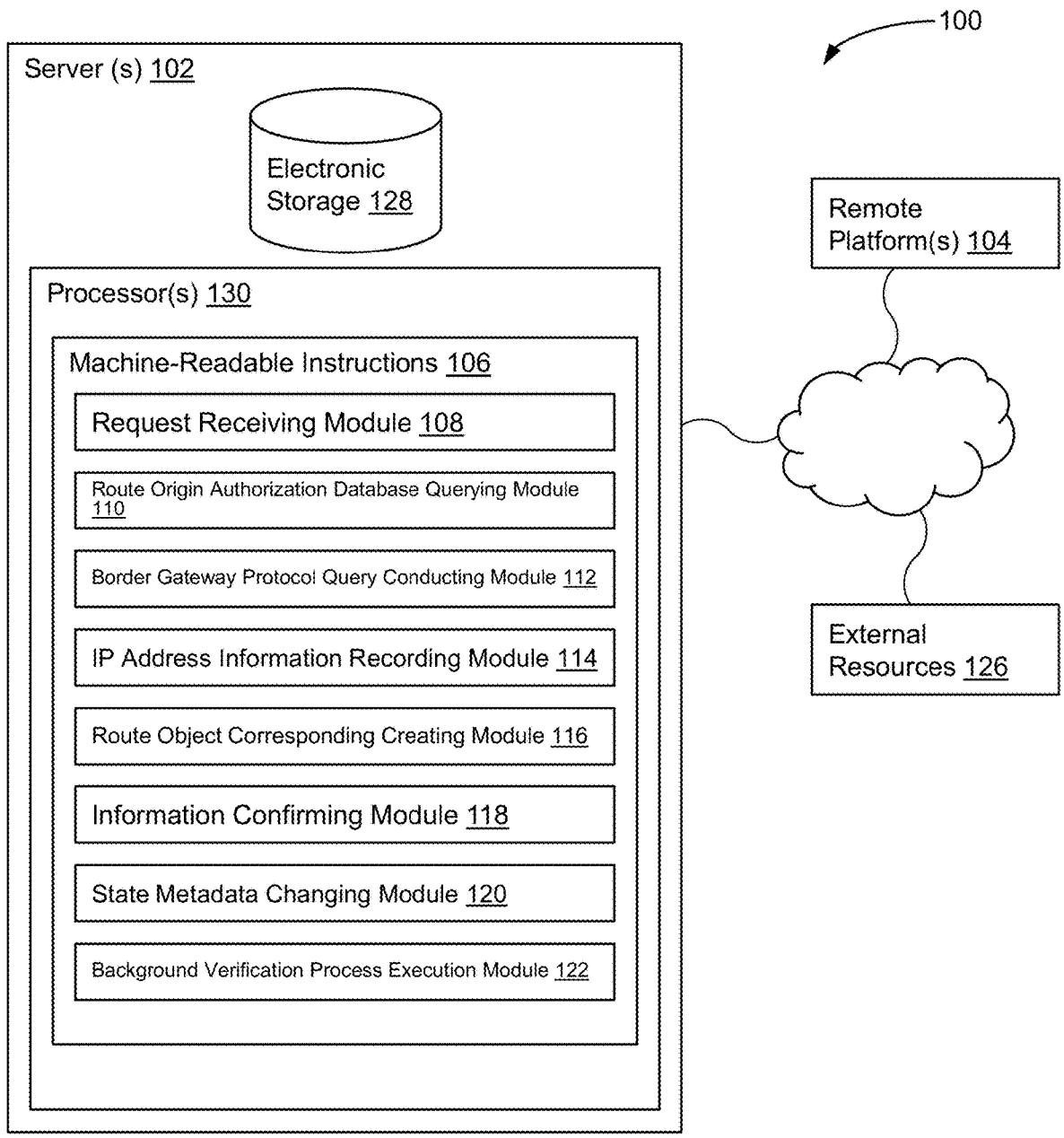
FIG. 1 is a schematic block diagram of a computer system architecture configured for managing IP addresses, in accordance with one or more implementations.

FIG. 1 illustrates a system 100 configured for managing IP addresses, in accordance with one or more implementations. The system can be used to implement a dynamic mechanism for assigning IP addresses to parties other than registrants of the IP addresses, such as service providers and client devices accessing the services over the internet. In some implementations, system 100 may include one or more servers 102. Server(s) 102 may be configured to communicate with one or more remote computing platforms 104 according to a client/server architecture and/or other architectures. Users, such as service providers requiring use of IP addresses and registrants of IP addresses having excess IP addresses may access system 100 via remote computing platform(s) 104.

Server(s) 102 may be configured by machine-readable instructions 106. Machine-readable instructions 106 may include one or more instruction modules. The instruction modules may include computer program modules. The instruction modules may include one or more of request receiving module 108, route origin authorization database querying module 110, border gateway protocol query conducting module 112, IP address information recording module 114, route object corresponding creating module 116, information confirming module 118, state metadata changing module 120, background verification process execution module 122, and/or other instruction modules.

Request receiving module 108 may be configured to receive, from an IP address management system (IPAM) of a registrant of unused IP addresses, a request to add to a database IP addresses registered to the registrant for temporarily or permanently assigning IP addresses for use by service providers in exchange for payment. By way of non-limiting example, the request may include IP address subnet information specifying at least one IP address subnet associated with the registrant, and information indicating the identity of the registrant. The request may specify the at least one IP subnet in CIDR notation. The request may further include at least one of a minimum and/or maximum split size for the at least one IP address subnet.

Route origin authorization database querying module 110 may be configured to query a route origin authorization (ROA) database confirm that the corresponding ISP and its autonomous system (AS) is authorized to originate the at least one IP address subnet. A Route Origin Authorization (ROA) is a cryptographically signed object that states which Autonomous System is authorized to originate a certain prefix. A ROA can contain three informational elements:

The AS Number that is authorized
The prefix that may be originated from the AS
The Maximum Length of the prefix Maximum Length specifies the length of the most specific IP prefix that the AS is authorized to advertise. In some implementations, querying a route origin authorization database may include validation of ROA cryptographically signed objects against a regional internet registry resource public key infrastructure. Border gateway protocol query conducting module 112 may be configured to conduct an external border gateway protocol query to confirm that the subnet is an available subnet that is not within use by an entity other than the registrant.

IP address information recording module 114 may be configured to record, in response to confirmation that the registrant corresponds to an authorized AS and that the subnet is an available subnet, the at least one IP address subnet information as a subnet record in a database, in electronic storage 128 for example, along with state metadata indicating that the at least one IP address subnet is in a pending state. The subnet record may be linked to a billing record in a billing database that may be separate from, or integrated with, the database. The subnet record may include metadata indicating one or more geographic regions and/or specific data center locations in which the at least one subnet is one of permitted and/or denied to be "announced", i.e. made available for use. The billing record can have pricing information, such as different pricing for subsets of the at least one subnet.

Route object corresponding creating module 116 may be configured to create, based on the aggregated information and processing thereof, at least one route object corresponding to the at least one subnet and recording the route objects as RADb records in a database. By way of non-limiting example, the route objects may include a route, an origin, and a description. Information confirming module 118 may be configured to confirm that the information in the route objects has been propagated to transit provider routers. Such confirmation can include a query against a global internet routing table. State metadata changing module 120 may be configured to, in response to the confirming, change the state metadata to indicate that the at least one IP address subnet is in a valid state that is available for assignment to ISP clients.

Figure 4:
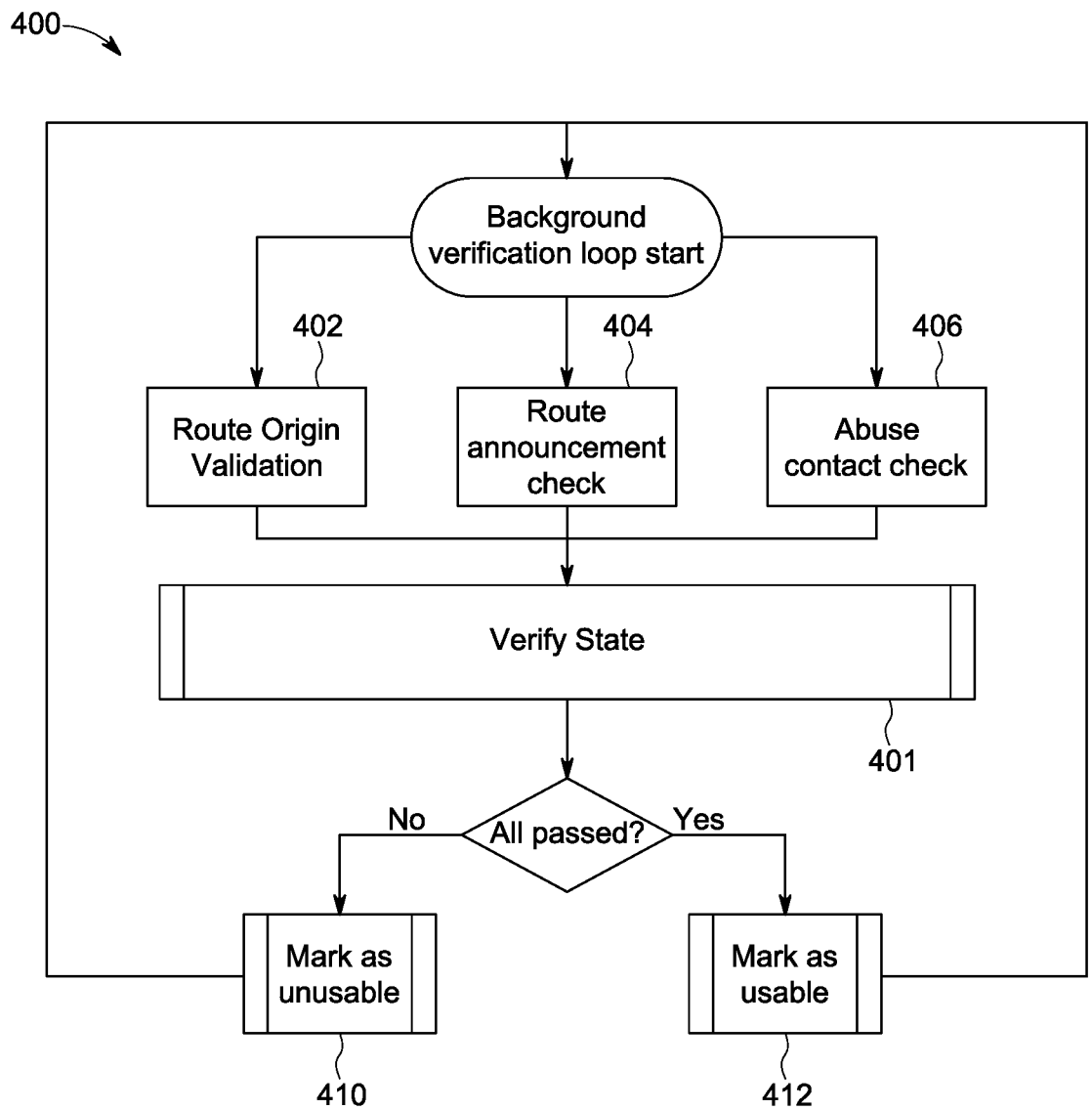
FIG. 4 is a workflow diagram of the background verification loop of FIG. 3.

Background verification process execution module 122 may be configured to execute a background verification process on the IP address subnet. The background verification may include a first process of periodically confirming that the registrant corresponds to an authorized AS that is authorized to originate the at least one IP address subnet. The background verification may also include a second process of periodically confirming that the information in the route objects has been propagated to transit provider routers. The background verification may also include a third process of periodically confirming that abuse contact information for the subnet recorded in, for example, the Whois database corresponds to the registrant. State metadata changing module 120 may be configured to change the state metadata to indicate that the at least one IP address subnet is not in a valid state if the background verification process is not successful. The background verification process is discussed in greater detail below with respect to FIG. 4.

In some implementations, server(s) 102, remote computing platform(s) 104, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, remote computing platform(s) 104, and/or external resources 126 may be operatively linked via some other communication channel(s).

A given remote computing platform 104 may include one or more processors configured to execute computer program modules. The computer program modules may be configured to enable an expert or user associated with the given remote computing platform 104 to interface with system 100 and/or external resources 126, and/or provide other functionality attributed herein to remote computing platform(s) 104. By way of non-limiting example, the given remote computing platform 104 may include one or more of a desktop computer, a laptop computer, a handheld computer, a tablet computing platform, a Smartphone, a gaming console, and/or other computing platforms.

External resources 126 may include sources of information outside of system 100, external entities participating with system 100, and/or other resources. For example, external resources 126 can be Whois, RADb, and route data databases. In some implementations, some or all of the functionality attributed herein to external resources 126 may be provided by other resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from remote computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, processor(s) 130 may include a plurality of processing units. These processing units may be physically located within the same device, or processor(s) 130 may represent processing functionality of a plurality of devices operating in coordination. Processor(s) 130 may be configured to execute the modules and/or other modules by software; hardware; firmware; some combination of software, hardware, and/or firmware; and/or other mechanisms for configuring processing capabilities on processor(s) 130. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although the modules are illustrated in FIG. 1 as being implemented within a single processing unit, in implementations in which processor(s) 130 includes multiple processing units, one or more of the modules may be implemented remotely from the other modules. The description of the functionality provided by the different modules is for illustrative purposes, and is not intended to be limiting, as any of modules may provide more or less functionality than is described. For example, one or more of modules may be eliminated, and some or all of its functionality may be provided by other ones of modules.

Figure 2:
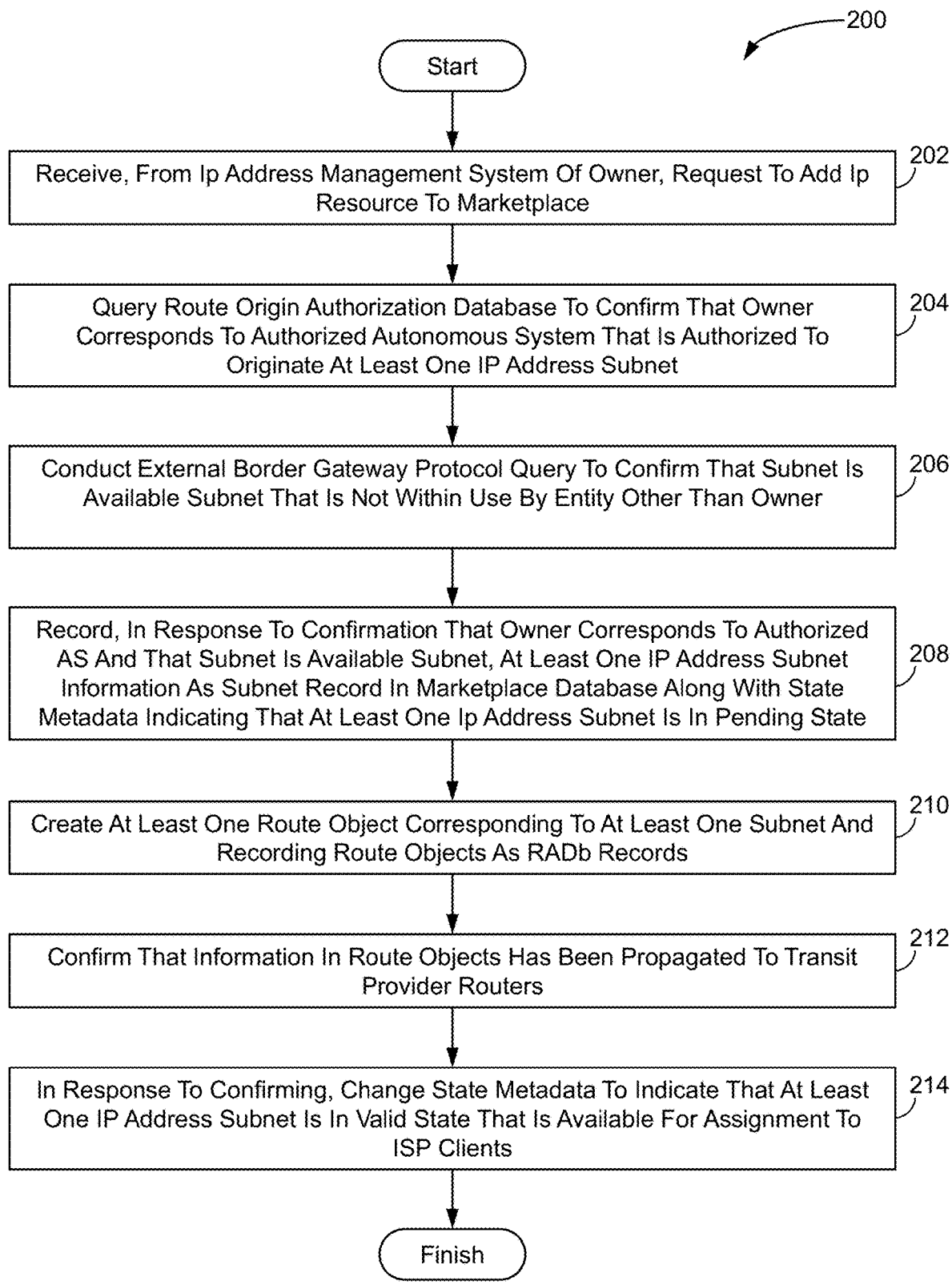
FIG. 2 is a flow chart of a method for managing IP addresses, in accordance with one or more implementations.

FIG. 2 illustrates a method 200 for managing IP addresses, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200. The method 200 may be implemented by system 100 of FIG. 1.

An operation 202 may include receiving, from an IP address management system of a registrant, a request to add to a database IP addresses registered to the registrant. The request may include IP address subnet information specifying at least one IP address subnet registered to the registrant, and information indicating the identity of the registrant. Operation 202 may be performed by one or more hardware processors configured by machine-readable instructions including a module that is the same as or similar to request receiving module 108, in accordance with one or more implementations.

An operation 204 may include querying a route origin authorization database to confirm that the that the corresponding ISP and its registrant corresponds to an authorized autonomous system that is authorized to originate the at least one IP address subnet. Operation 204 may be performed by one or more hardware processors configured by machine-readable instructions including a module that is the same as or similar to route origin authorization database querying module 110, in accordance with one or more implementations.

An operation 206 may include conducting an external border gateway protocol query to confirm that the subnet is an available subnet that is not within use by an entity other than the registrant. Operation 206 may be performed by one or more hardware processors configured by machine-readable instructions including a module that is the same as or similar to border gateway protocol query conducting module 112, in accordance with one or more implementations.

An operation 208 may include recording, in response to confirmation that the registrant corresponds to an authorized autonomous system and that the subnet is an available subnet, the at least one IP address subnet information as a subnet record in a database along with state metadata indicating that the at least one IP address subnet is in a pending state. Operation 208 may be performed by one or more hardware processors configured by machine-readable instructions including a module that is the same as or similar to IP address information recording module 114, in accordance with one or more implementations.

An operation 210 may include creating at least one route object corresponding to the at least one subnet and recording the route objects as RADb records. The route objects may include a route, an origin, and a description. Operation 210 may be performed by one or more hardware processors configured by machine-readable instructions including a module that is the same as or similar to route object corresponding creating module 116, in accordance with one or more implementations.

An operation 212 may include confirming that the information in the route objects has been propagated to transit provider routers. Operation 212 may be performed by one or more hardware processors configured by machine-readable instructions including a module that is the same as or similar to information confirming module 118, in accordance with one or more implementations.

An operation 214 may include, in response to the confirming, changing the state metadata to indicate that the at least one IP address subnet is in a valid state that is available for assignment to client devices. Operation 214 may be performed by one or more hardware processors configured by machine-readable instructions including a module that is the same as or similar to state metadata changing module 120, in accordance with one or more implementations.

Figure 3:
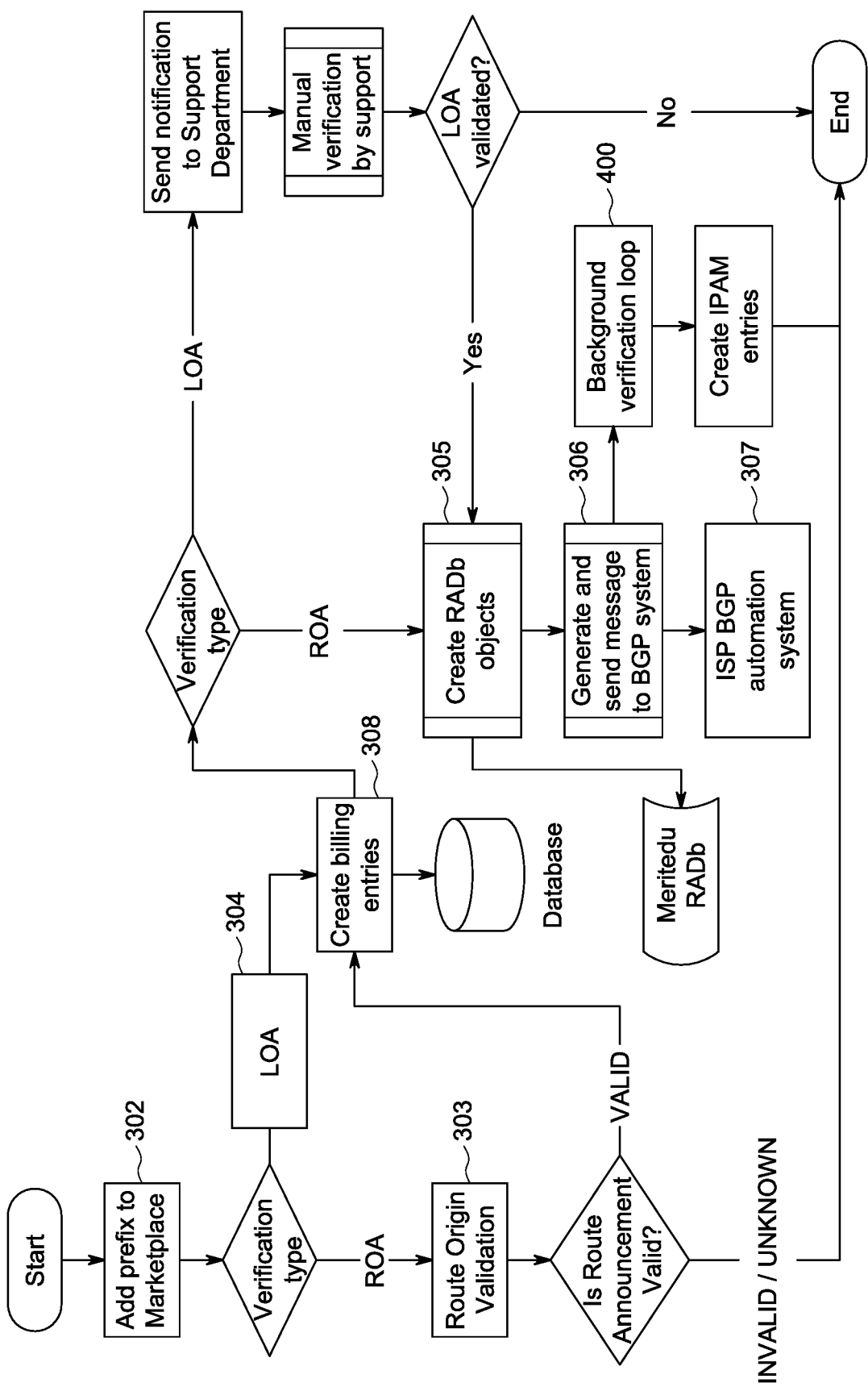
FIG. 3 is a workflow diagram for managing IP addresses, in accordance with one or more implementations.

FIG. 3 illustrates a workflow for adding an IP resource and related records to the database. At 302, A registrant of IP addresses provides information about its available IP resources, as described above, using various data control mechanisms, such as a UI, a RESTful API, and/or other mechanisms for providing data. The information can be provided in a request to add the IP resource to the address management system. A decision as to the type of pre-validations, such as ROA at 303 or Letter of Authorization (LOA) at 304, etc., can be made.

ROA validation includes the registrant adding a specific record in the Regional Internet Registry system, by using the respective interfaces for such systems, which includes information about where and how the subnet can be announced. ROA entry may be required to confirm that subnet is eligible for the addition to the marketplace. ROA validation could be performed using RPKI Validator from RIPE NCC (github.com/RIPE-NCC/rpki-validator-3). The RPKI Validator can collect all ROA information from all RIRs at regular time intervals. The information can be gathered over rsync protocol from official RIR repositories.

Alternatively, when using LOA pre-validation, ROA validations can be omitted, and the subnet can be marked to be confirmed manually based on a written announcement from a trusted party, and commensurate verification of the information. Certain information can be provided in relation to the LOA, such as the company name, contact details etc. The confirmation can be done through an administrative system/interface (web based, desktop app, phone app) where a human operator revises the submitted LOA information and can take additional steps to verify such information, for example contacting the registrant by phone or email to verify that the contact details are correct. The reviewer can then change the subnet LOA status to valid/invalid so that further systems can continue the validation checks.

The pre-validation can be performed to quickly accept or deny the submission based on pre-validation results. Alternatively, the pre-validation process can be done in the background asynchronously with delay of feedback to the IP address registrant, utilizing micro-services, which could communicate through messaging protocols like AMQP. The registrant could be allowed to read and modify their resources through data control mechanisms provided by the ISP, such as a RESTful API, a Web UI or a mobile device app, utilizing data formats such as JSON, XML, and the like. As noted above, the registrant can configure subnets brought into the marketplace by limiting the minimum and maximum split of the subnet and setting unique prices for each split size using various data control mechanisms (UI, RESTful API, etc.). For example, if the registrant brings in a subnet of size /20 (4096 IPs) they can choose to limit its sale to /24 (256 IPs) subnet per purchase. This allows registrants to avoid fragmentation of their address ranges and gives them more precise control of their resources.

As an additional feature, the registrant could be presented with current aggregated marketplace statistics. For example, the statistics can include what subnet sizes were present for what average prices in a given timeframe. The registrant could then use this information to decide on what prices to set. Such statistics could be collected at predefined time intervals and kept for historical purposes. Such data could be stored in a database, in electronic storage 128 of FIG. 1 for example, using direct connections (TCP) or broadcasted using messaging protocols such as AMQP to other systems.

The registrant should have some type of IP Address Management system (IPAM) where the listed subnets will reside. IP Address Management (IPAM) refers to a method of planning, tracking and managing the information associated with a network's IP address space. IPAM systems, such as those commercially available from DEVICE42™ Inc., can automate the administration of many tasks involved in IP space management, including writing DNS records and configuring DHCP settings. The IPAM can be a system with a REST API through which the control of IP resources is performed. The subnets in IPAM can be split up as needed into subset of smaller subnets. The subnets (including subsets thereof) can contain various metadata which could be consumed by the rest of the ISP systems. The IPAM should allow assigning of various IP resources (including subsets thereof) to the clients of ISP.

As an example of splitting subnets and managing the same, when a client wishes to acquire 2 subnets of /24, and there's a /20 subnet available in the IPAM, the /20 should be split up into smaller chunks or /24 and given to the client. Additionally, the ISP infrastructure configuration could be automated using the information in IPAM. For example, router automation systems could acquire information from IPAM using data transfer protocols to determine what routes should be configured on specific routers. In some implementations a REST API is used for communication with IPAM. In other implementations, communication could be realized through direct database connections, or different specialized APIs.

It may be desirable to have the Registrant of the IP addresses provide abuse contact information corresponding to the subnet. Further validation can be performed for the abuse contact set on a subnet, by comparing the abuse contact information with the registrant information, by querying the publicly available Whois database. Whois information can be accessed in multiple ways. For example, the old method of using certain Whois servers over TCP port 43, or using the RDAP protocol, which provides the same information but in a more digestible format (JSON) for machines. Abuse contact information allows an entity responsible for managing the subnet to be contacted should problems occur with use of IP addresses in the subnet. For example, if subnet is part of a botnet, used for DDoS attacks or large-scale spam.

To be a valid marketplace entry, the submitted subnet can be verified against existing data in various ISPs systems (which may include databases, routers, and other networking devices). The submission can be denied if conflicting information is found in those systems; for example, if the subnet is already listed in the marketplace, or the subnet is already present on the ISP routers. To be a valid marketplace entry, the subnet to be added must not be announced in any local routers, i.e. that subnet in question is not already in use within the local network by a different entity. This verification can be performed by connecting to local routers and checking their BGP tables. BGP is short for Border Gateway Protocol and it is the routing protocol used to route traffic across the internet. The public Internet is composed of over 90,000 "Autonomous Systems" (AS's), many of which are very small, while some are very large both in terms of geographical coverage and numbers of users. eBGP or External Border Gateway Protocol is used to bind these networks together in a form of a shared network map that essentially tells each AS how to pass on a packet that is addressed to a reachable destination in a manner that will get the packet closer to its intended destination.

After passing initial validations, the subnet(s) is registered in the database of a marketplace system, for example, which can be stored in memory 128 of FIG. 1, and is set to pending state. During this process background systems continuously perform validation checks to ensure that subnet retains its validity states, in the manner described below with respect to FIG. 4. Once all states are confirmed to be valid subnet is marked as active in the database and is announced in the marketplace as available for assignment to ISPs and users, through a leasing arrangement, or other rights of use.

Many Transit providers utilize the Routing Assets Database (RADb) for information on which autonomous systems have various subnets announced. The RADb (found at https://www.radb.net) is managed by Merit University (https://www.merit.edu/services/internet/radb) and is used by many ISPs to manage their IP resources and check the resources of others. Therefore, after the subnet validity is confirmed for marketplace, RADb records can be created at 305 and using RADb REST API, by sending information such as route, origin (AS) and description in a JSON format. BGP tables can be updated with the information at 306 and sent to an ISP BGP automation system at 307. Further, billing records are created at 308.

When the subnet in marketplace has been ordered and assigned to ISP clients, the accounting can be performed by a dedicated microservice (for example an earnings calculator). This service monitors the usage of IP resources from the market and calculates the value to be transferred to the Registrant of the relevant IP addresses. This can be accomplished by looking at the database records (marketplace, ISP's services, pricing for the marketplace subnets), bundling them together and summing the monetary amount. A new record is created indicating that the marketplace subnet has collected funds, which can be used as a reference for paying out the mentioned amount to the registrant. Payout records can have states which indicate that the payout has been determined (pending); that the payout has been performed (complete); that the payout has been denied (denied). Payouts can be managed through administrative tools, for example a web-based UI, which would retrieve the information about payouts using data transfer protocols such as RESTful APIs, direct database connections etc. Such tools could change the state of the payout. The payout calculation could include logic to calculate the commissions per subnet for the ISP's benefit. Such logic could be percentage or fixed amount based per subnet payout.

It is well known that, the internet, and all related addressing mechanisms, are very dynamic. Address assignments and other metadata can change constantly. Therefore, background verification loop 400 is periodically executed for each subnet to ensure that all addresses and related data are valid and current. The background verification loop can list or de-list the prefix in the database. If all checks are satisfied—the subnet is maintained as listed/announced in marketplace; if any fail—the subnet is marked as invalid/ "deannounced". This process repeats periodically unless the subnet is removed from the system. The background verification loop of one implementation is illustrated in detail in FIG. 4, and constantly monitors the subnets, to continuously or periodically verify all the previous validations (ROA, announcement in local routers, announcement in upstream routers, and abuse information).

Each validation can be performed in its own process (daemon/microprocess). Each process can set the validity status (valid/invalid) for the corresponding validation. The statuses can be stored in the billing database, on the subnet entry or otherwise in association with the corresponding subnet(s). Validation state controller 401 can periodically analyze subnets in the database. If any of the validity states are found to be invalid, the state controller could mark the subnet as unusable (at 410) across the ISP infrastructure. Otherwise, the subnet is marked as usable (at 412). This can include changing the global status in the billing database, changing the status in IPAM (over REST API, json), notifying (for example, over AMQP transport) ISP specific systems to "deannounce" the subnet from routers and other networking devices. If the subnet state changes from invalid to valid at any point, the actions described above can be reversed by using same systems and protocols with different payloads/data.

Additionally, the state controller can have the ability to receive instant notifications from each of the validation microprocesses. This can be done over AMQP. When such notification is received, the state controller reads the new subnet state from the notification itself without the need to check the database. The notification is used as a data source for the actions described in the state controller description above. This allows for a more instantaneous reaction to subnet validity state changes.

Background verification loop includes route origin validation 402, a route announcement validation 404, and abuse contact validation 406. Route origin validation can be accomplished by route origin authorization database querying module 110, which, as noted above, may be configured to query a ROA database to confirm that the registrant corresponds to an AS that is authorized to originate the at least one IP address subnet. In some implementations, querying a route origin authorization database may include validation of ROA cryptographically signed objects against a regional internet registry resource public key infrastructure. Border gateway protocol query conducting module 112 may be configured to conduct an external border gateway protocol query to confirm that the subnet is an available subnet that is not within use by an entity other than the registrant.

Route announcement validation 404 can be performed by connecting to local routers and checking their BGP tables. As noted above, BGP is the routing protocol used to route traffic across the internet. eBGP or External Border Gateway Protocol is used to bind these networks together in a form of a shared network map that essentially tells each AS how to pass on a packet that is addressed to a reachable destination in a manner that will get the packet closer to its intended destination.

Abuse validation 406 can be performed for the abuse contact set on a subnet, by comparing the abuse contact information with the registrant information, by querying the publicly available Whois database. As noted above, Whois information can be accessed in multiple ways, for example the old method of using certain Whois servers over TCP port 43, or using the new RDAP protocol, which provides the same information but in a more digestible format (JSON) for machines. Abuse contact information allows an entity responsible for managing the subnet to be contacted should problems occur with use of IP addresses in the subnet. For example, if subnet is part of a botnet, used for DDoS attacks or large-scale spam.

As noted above, the implementations are distributed systems that gather various information from various remote databases and compile the information into a novel database structure that facilitates management of IP addresses. In addition to the remote databases noted above, information can be collected from web hosting billing automation platforms, such as the WHMCS™ platform, the BLESTA™ platform, the HOSTBILL™ platform or any other commercial or free relational database.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer system configured for managing Internet Protocol (IP) addresses, the system comprising:
   one or more hardware processors configured by machine-readable instructions to: receive, from an Internet Protocol (IP) address management system of a registrant, a request to add an Internet Protocol (IP) resource to a marketplace, the request including Internet Protocol (IP) address subnet information specifying at least one Internet Protocol (IP) address subnet associated with the registrant, and information indicating the identity of the registrant;
   query a route origin authorization database to confirm that the registrant corresponds to an authorized autonomous system that is authorized to originate the at least one Internet Protocol (IP) address subnet;
   conduct an external border gateway protocol query to confirm that the at least one Internet Protocol (IP) address subnet is an available subnet that is not within use by an entity other than the registrant;
   record, in response to confirmation that the registrant corresponds to an authorized autonomous system and that the at least one Internet Protocol (IP) address subnet is an available subnet, the Internet Protocol (IP) address subnet information as a subnet record in a marketplace database along with state metadata indicating that the at least one Internet Protocol (IP) address subnet is in a pending state;
   create at least one route object corresponding to the at least one Internet Protocol (IP) address subnet and recording the at least one route object as a Routing Assets Database (RADb) record, the at least one route object including information indicating a route, an origin, and a description;
   confirm that the information in the at least one route object has been propagated to transit provider routers; and
   in response to the confirming, change the state metadata to indicate that the at least one Internet Protocol (IP) address subnet is in a valid state that is available for assignment to devices controlled by parties other than the registrant.

2. The system of claim 1, wherein the one or more hardware processors are further configured by machine-readable instructions to:
  execute a background verification process on the at least one Internet Protocol (IP) address subnet, wherein the background verification process comprises:
    a first process of periodically confirming that the registrant corresponds to an authorized autonomous system that is authorized to originate the at least one Internet Protocol (IP) address subnet;
    a second process of periodically confirming that the information in the at least one route object has been propagated to transit provider routers; and
    a third process of periodically confirming that abuse contact information for the at least one Internet Protocol (IP) address subnet recorded in a Whois database corresponds to the registrant; and
  in response to a failure of confirmation by any of the first process, the second process and/or the third process, change the state metadata to indicate that the at least one Internet Protocol (IP) address subnet is not in a valid state.

3. The system of claim 1, wherein the request specifies the at least one Internet Protocol (IP) address subnet in Classless Inter-Domain Routing (CIDR) notation.

4. The system of claim 1, wherein querying a route origin authorization database comprises validation of Route Origin Authorization (ROA) cryptographically signed objects against a regional internet registry resource public key infrastructure.

5. The system of claim 1, wherein confirming that the information in the at least one route object has been propagated to transit provider routers comprises a query against a global internet routing table.

6. The system of claim 1, wherein the request further includes at least one of a minimum and/or maximum split size for the at least one Internet Protocol (IP) address subnet.

7. The system of claim 1, wherein the subnet record is linked to a billing record in a billing database, the billing record including pricing information.

8. The system of claim 7, wherein the pricing information can include different pricing for subsets of the at least one Internet Protocol (IP) address subnet.

9. The system of claim 1, wherein the subnet record includes metadata indicating one or more geographic regions and/or specific data center locations in which the at least one Internet Protocol (IP) address subnet is one of permitted to be announced.

10. A method for managing a marketplace for Internet Protocol (IP) addresses, the method comprising:
  receiving, from an Internet Protocol (IP) address management system of a registrant, a request to add an Internet Protocol (IP) resource to the marketplace, the request including Internet Protocol (IP) address subnet information specifying at least one Internet Protocol (IP) address subnet associated with the registrant, and information indicating the identity of the registrant;
  querying a route origin authorization database to confirm that the registrant corresponds to an authorized autonomous system that is authorized to originate the at least one Internet Protocol (IP) address subnet;
  conducting an external border gateway protocol query to confirm that the at least one Internet Protocol (IP) address subnet is an available subnet that is not within use by an entity other than the registrant;
  recording, in response to confirmation that the registrant corresponds to an authorized autonomous system and that the at least one Internet Protocol (IP) address subnet is an available subnet, the Internet Protocol (IP) address subnet information as a subnet record in a marketplace database along with state metadata indicating that the at least one Internet Protocol (IP) address subnet is in a pending state;
  creating at least one route object corresponding to the at least one Internet Protocol (IP) address subnet and recording the at least one route object as a Routing Asset Database (RADb) record, the at least one route object including information indicating a route, an origin, and a description;
  confirming that the information in the at least one route object has been propagated to transit provider routers;
  in response to the confirming, changing the state metadata to indicate that the at least one Internet Protocol (IP) address subnet is in a valid state that is available for assignment to devices controlled by parties other than the registrant.

11. The method of claim 10, further comprising:
  executing a background verification process on the at least one Internet Protocol (IP) address subnet, wherein the background verification process comprises:
    a first process of periodically confirming that the registrant corresponds to an authorized autonomous system that is authorized to originate the at least one Internet Protocol (IP) address subnet;
    a second process of periodically confirming that the information in the at least one route object has been propagated to transit provider routers; and
    a third process of periodically confirming that abuse contact information for the at least one Internet Protocol (IP) address subnet recorded in a Whois databased database corresponds to the registrant; and
  in response to a failure of confirmation by any of the first process, the second process and/or the third process, changing the state metadata to indicate that the at least one Internet Protocol (IP) address subnet is not in a valid state.

12. The method of claim 10, wherein the request specifies the at least one Internet Protocol (IP) address subnet in Classless Inter-Domain Routing (CIDR) notation.

13. The method of claim 10, wherein querying a route origin authorization database comprises validation of Route Origin Authorization (ROA) cryptographically signed objects against a regional internet registry resource public key infrastructure.

14. The method of claim 10, wherein confirming that the information in the at least one route object has been propagated to transit provider routers comprises a query against a global internet routing table.

15. The method of claim 10, wherein the request further includes at least one of a minimum and/or maximum split size for the at least one Internet Protocol (IP) address subnet.

16. The method of claim 10, wherein the subnet record is linked to a billing record in a billing database, the billing record including pricing information.

17. The method of claim 16, wherein the pricing information can include different pricing for subsets of the at least one Internet Protocol (IP) address subnet.

18. The method of claim 10, wherein the subnet record includes metadata indicating one or more geographic regions and/or specific data center locations in which the at least one Internet Protocol (IP) address subnet is permitted to be announced.

19. A non-transient computer-readable storage medium having instructions embodied thereon, the instructions being executable by one or more processors to perform a method for managing a marketplace for Internet Protocol (IP) addresses, the method comprising:
- receiving, from an Internet Protocol (IP) address management system of a registrant, a request to add an Internet Protocol (IP) resource to the marketplace, the request including Internet Protocol (IP) address subnet information specifying at least one Internet Protocol (IP) address subnet associated with the registrant, and information indicating the identity of the registrant;
- querying a route origin authorization database to confirm that the registrant corresponds to an authorized autonomous system that is authorized to originate the at least one Internet Protocol (IP) address subnet;
- conducting an external border gateway protocol query to confirm that the at least one Internet Protocol (IP) address subnet is an available subnet that is not within use by an entity other than the registrant;
- recording, in response to confirmation that the registrant corresponds to an authorized autonomous system and that the at least one Internet Protocol (IP) address subnet is an available subnet, the at Internet Protocol (IP) address subnet information as a subnet record in a marketplace database along with state metadata indicating that the at least one Internet Protocol (IP) address subnet is in a pending state;
- creating at least one route object corresponding to the at least one Internet Protocol (IP) address subnet and recording the at least one route object as a Routing Assets Database (RADb) record, the at least one route object including information indicating a route, an origin, and a description;
- confirming that the information in the at least one route object has been propagated to transit provider routers;
- in response to the confirming, changing the state metadata to indicate that the at least one Internet Protocol (IP) address subnet is in a valid state that is available for assignment to devices controlled by parties other than the registrant.

20. The non-transitory computer-readable storage medium of claim 19, wherein the method further comprises:
executing a background verification process on the at least one Internet Protocol (IP) address subnet, wherein the background verification process comprises:
- a first process of periodically confirming that the registrant corresponds to an authorized autonomous system that is authorized to originate the at least one Internet Protocol (IP) address subnet;
- a second process of periodically confirming that the information in the at least one route object has been propagated to transit provider routers;
- a third process of periodically confirming that abuse contact information for the at least one Internet Protocol (IP) address subnet recorded in a Whois database corresponds to the registrant; and
- in response to a failure of confirmation by any of the first process, the second process and/or the third process, changing the state metadata to indicate that the at least one Internet Protocol (IP) address subnet is not in a valid state.

21. The non-transitory computer-readable storage medium of claim 19, wherein the request specifies the at least one Internet Protocol (IP) address subnet in Classless Inter-Domain Routing (CIDR) notation.

22. The non-transitory computer-readable storage medium of claim 19, wherein querying a route origin authorization database comprises validation of Route Origin Authorization (ROA) cryptographically signed objects against a regional internet registry resource public key infrastructure.

23. The non-transitory computer-readable storage medium of claim 19, wherein confirming that the information in the at least one route object has been propagated to transit provider routers comprises a query against a global internet routing table.

24. The non-transitory computer-readable storage medium of claim 19, wherein the request further includes at least one of a minimum and/or maximum split size for the at least one Internet Protocol (IP) address subnet.

25. The non-transitory computer-readable storage medium of claim 19, wherein the subnet record is linked to a billing record in a billing database, the billing record including pricing information.

26. The non-transitory computer-readable storage medium of claim 25, wherein the pricing information can include different pricing for subsets of the at least one Internet Protocol (IP) address subnet.

27. The non-transitory computer-readable storage medium of claim 19, wherein the subnet record includes metadata indicating one or more geographic regions and/or specific data center locations in which the at least one Internet Protocol (IP) address subnet is permitted to be announced.

28. A computer implemented method for managing IP addresses and state metadata to make Internet Protocol (IP) addresses available in a marketplace for assignment to devices, the Internet Protocol (IP) addresses being stored as records including Internet Protocol (IP) address subnet information in a marketplace database in association with the state metadata, the method including executing a background verification process on at least one Internet Protocol (IP) address subnet, wherein the background verification process comprises:
- a first process of periodically confirming that a registrant corresponds to an authorized autonomous system that is authorized to originate the at least one Internet Protocol (IP) address subnet;
- a second process of periodically confirming that the information in at least one route object has been propagated to transit provider routers; and
- a third process of periodically confirming that abuse contact information for the at least one Internet Protocol (IP) address subnet recorded in a Whois database corresponds to the registrant; and
- in response to a failure of confirmation by any of the first process, the second process and/or the third process, changing the associated state metadata to indicate that the at least one Internet Protocol (IP) address subnet is not in a valid state.

29. A computer system for managing Internet Protocol (IP) addresses and state metadata to make Internet Protocol (IP) addresses available in a marketplace for assignment to devices, the Internet Protocol (IP) addresses being stored as records including Internet Protocol (IP) address subnet information in a marketplace database in association with the state metadata, the system including at least one computer processor executing a background verification process on at least one Internet Protocol (IP) address subnet, wherein the background verification process comprises:
- a first process of periodically confirming that a registrant corresponds to an authorized autonomous system that is authorized to originate the at least one Internet Protocol (IP) address subnet;

a second process of periodically confirming that the information in at least one route object has been propagated to transit provider routers; and a third process of periodically confirming that abuse contact information for the at least one Internet Protocol (IP) address subnet recorded in a Whois database corresponds to the registrant; and in response to a failure of confirmation by any of the first process, the second process and/or the third process, changing the associated state metadata to indicate that the at least one Internet Protocol (IP) address subnet is not in a valid state.

\* \* \* \* \*